(12) United States Patent
Chen

(10) Patent No.: US 7,623,343 B2
(45) Date of Patent: Nov. 24, 2009

(54) PHYSICAL CONFIGURATION OF COMPUTER SYSTEM

(75) Inventor: Kun-Fu Chen, Taipei (TW)

(73) Assignee: Inventec Corporation, Taipei (TW)

( * ) Notice: Subject to any disclaimer, the term of this patent is extended or adjusted under 35 U.S.C. 154(b) by 332 days.

(21) Appl. No.: 11/735,608

(22) Filed: Apr. 16, 2007

(65) Prior Publication Data

US 2008/0253076 A1 Oct. 16, 2008

(51) Int. Cl.
*G06F 1/16* (2006.01)

(52) U.S. Cl. .............................. 361/679.32; 361/679.4; 361/679.47

(58) Field of Classification Search ............ 361/679.02, 361/679.48
See application file for complete search history.

(56) References Cited

U.S. PATENT DOCUMENTS

| | | | |
|---|---|---|---|
| 5,136,468 A * | 8/1992 | Wong et al. ............... 361/679.6 |
| 5,218,514 A * | 6/1993 | Huynh et al. ........... 361/679.47 |
| 5,406,453 A * | 4/1995 | Cusato et al. ............... 361/733 |
| 5,440,755 A * | 8/1995 | Harwer et al. .............. 710/315 |
| 5,513,329 A * | 4/1996 | Pecone ....................... 710/301 |
| 5,572,400 A * | 11/1996 | Roesner et al. ........ 361/679.58 |
| 6,046,912 A * | 4/2000 | Leman ....................... 361/784 |
| 6,049,449 A * | 4/2000 | Cranston et al. ....... 361/679.58 |
| 6,067,226 A * | 5/2000 | Barker et al. ............. 361/679.6 |
| 6,118,668 A * | 9/2000 | Scholder et al. ............. 361/753 |
| 6,215,656 B1 * | 4/2001 | O'Neal et al. .......... 361/679.02 |
| 6,216,184 B1 * | 4/2001 | Fackenthall et al. ......... 710/301 |
| 6,247,078 B1 * | 6/2001 | Ebert et al. ................. 710/301 |
| 6,411,511 B1 * | 6/2002 | Chen .......................... 361/697 |
| 6,711,002 B1 * | 3/2004 | Fan ........................ 361/679.02 |
| 6,889,280 B1 * | 5/2005 | Barmore ..................... 710/301 |
| 6,967,837 B2 * | 11/2005 | Shih ....................... 361/679.48 |
| 6,978,333 B2 * | 12/2005 | Timmins et al. ............ 710/301 |
| 7,052,315 B2 * | 5/2006 | Murr et al. ................ 439/540.1 |
| 7,075,784 B2 * | 7/2006 | Sullivan ................. 361/679.47 |
| 2001/0014927 A1 * | 8/2001 | Chang et al. ................ 710/102 |
| 2004/0193773 A1 * | 9/2004 | Wang .......................... 710/313 |
| 2004/0252451 A1 * | 12/2004 | Wilson ....................... 361/685 |
| 2005/0013112 A1 * | 1/2005 | Lin ............................. 361/686 |
| 2005/0018388 A1 * | 1/2005 | Shih ............................ 361/679 |
| 2005/0276004 A1 * | 12/2005 | Hsu et al. .................... 361/679 |
| 2008/0144272 A1 * | 6/2008 | Liang ......................... 361/685 |
| 2008/0180896 A1 * | 7/2008 | McClure et al. ............. 361/683 |

\* cited by examiner

*Primary Examiner*—Jayprakash N Gandhi
*Assistant Examiner*—Anthony Q Edwards
(74) *Attorney, Agent, or Firm*—CKS & Partners Co., Ltd.

(57) ABSTRACT

A physical configuration of a computer system is described. The motherboard has a first series of I/O ports at an edge thereof. A riser card is perpendicularly connected with the motherboard, wherein the riser card has a second series of I/O ports at an edge thereof. A housing encloses the motherboard and the riser card, wherein the housing has a plurality of openings, exposing each of the first series of I/O ports and the second series of I/O ports so as to form an L-shaped I/O port area on a flat surface thereof.

10 Claims, 5 Drawing Sheets

PHYSICAL CONFIGURATION OF COMPUTER SYSTEM

BACKGROUND

1. Field of Invention

The present invention relates to a computer system. More particularly, the present invention relates to a physical configuration of a computer system.

2. Description of Related Art

Nowadays, how a space inside a computer system being used is carefully considered and no space should be idle. For instance, a housing of a standard computer server, i.e. a 1-U sever or 2-U sever, has been restricted to a specified size. When an unused space exists in its housing, efforts is taken to fill the unused space.

FIG. 1 illustrates a conventional computer server. A housing 20 encloses several circuit boards and a fan module 22 inside. A motherboard 21 is fastened to a bottom wall of the housing. A riser card 23 is installed on the motherboard 21. Two expansion cards 24 are further installed on the riser card 23. Both the motherboard 21 and the expansion cards 24 have I/O ports. Due to the physical configuration inside the housing 20, the fan module 22 and those I/O ports 212/241 cannot be placed in one back end of the housing 20. Therefore, no more space can be left for accommodating more electrical components.

For the forgoing reasons, there is a need for an improved physical configuration of a computer system.

SUMMARY

A computer system has the following physical configuration. The motherboard has a first series of I/O ports at an edge thereof. A riser card is perpendicularly connected with the motherboard, wherein the riser card has a second series of I/O ports at an edge thereof. A housing encloses the motherboard and the riser card, wherein the housing has a plurality of openings, exposing each of the first series of I/O ports and the second series of I/O ports so as to form an L-shaped I/O port area on a flat surface thereof.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
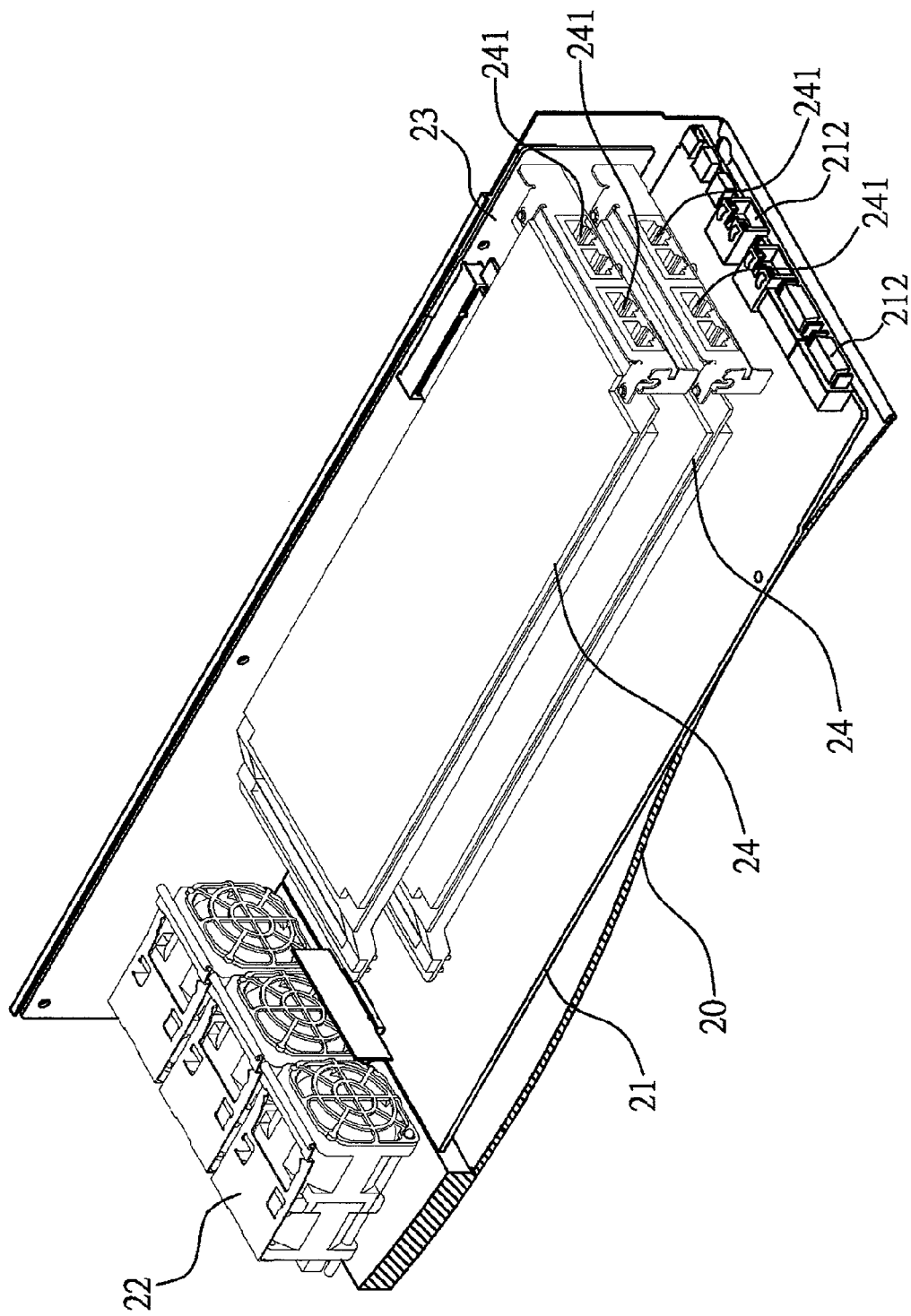
FIG. 1 illustrates a conventional computer server.

Reference will now be made in detail to the present embodiments of the invention, examples of which are illustrated in the accompanying drawings. Wherever possible, the same reference numbers are used in the drawings and the description to refer to the same or like parts.

Figure 2:
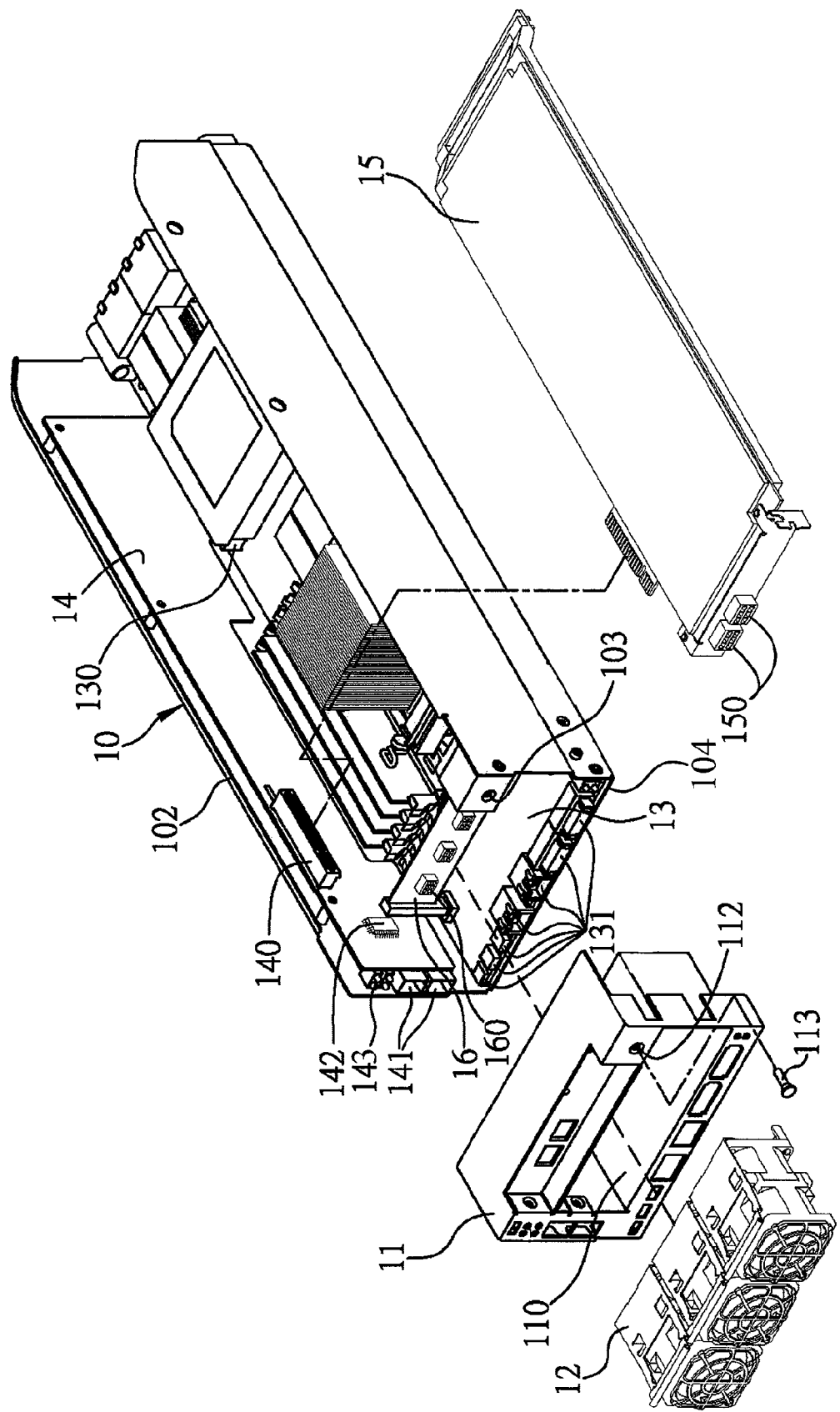
FIG. 2 illustrates an exploded view of a computer system according to one embodiment of this invention.
Figure 3:
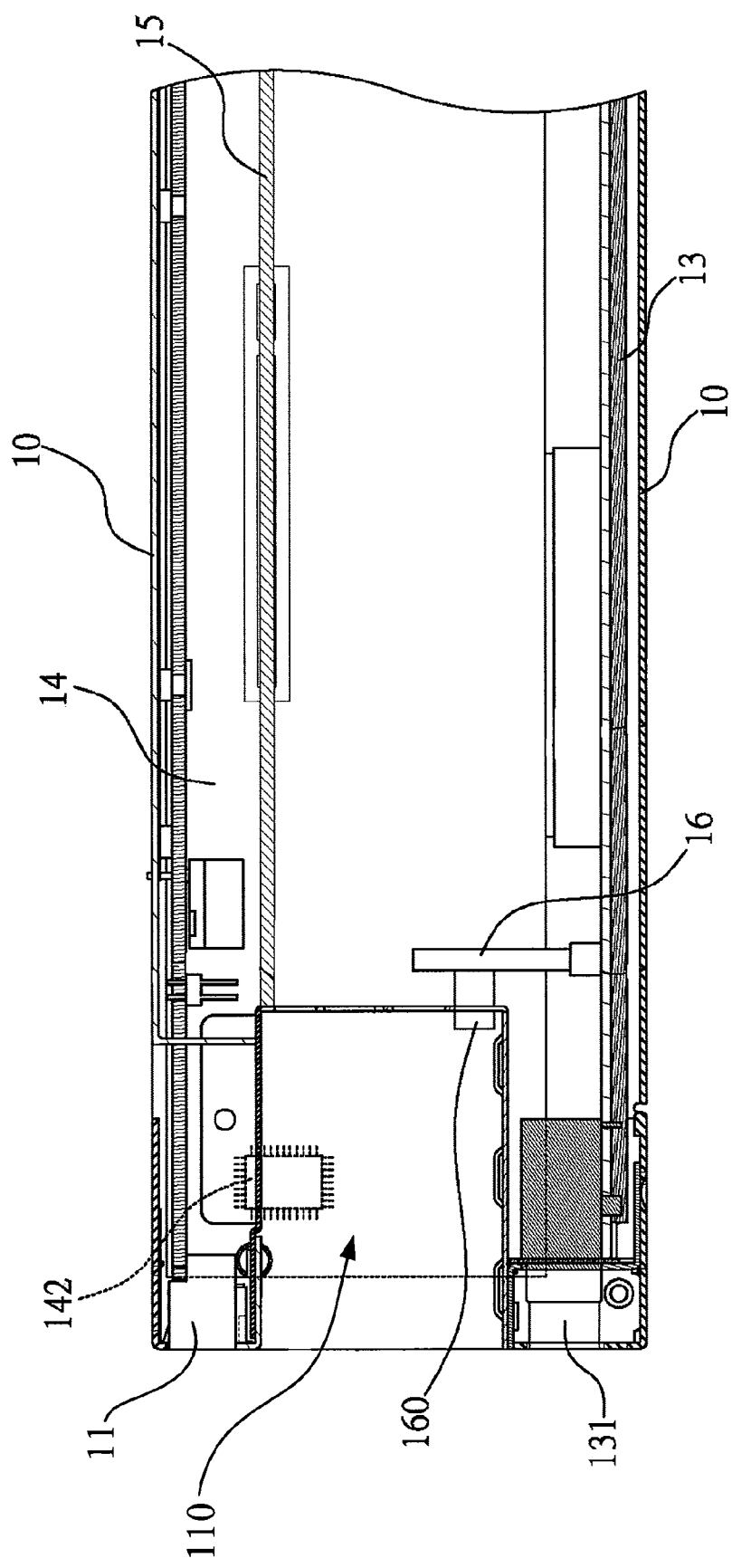
FIG. 3 illustrates a cross-sectional view of the computer system in FIG. 2.

FIG. 2 illustrates an exploded view of a computer system according to one embodiment of this invention. FIG. 3 illustrates a cross-sectional view of the computer system in FIG. 2, and FIG. 4 illustrates an enlarged view of a side housing in FIG. 2.

Figure 4:
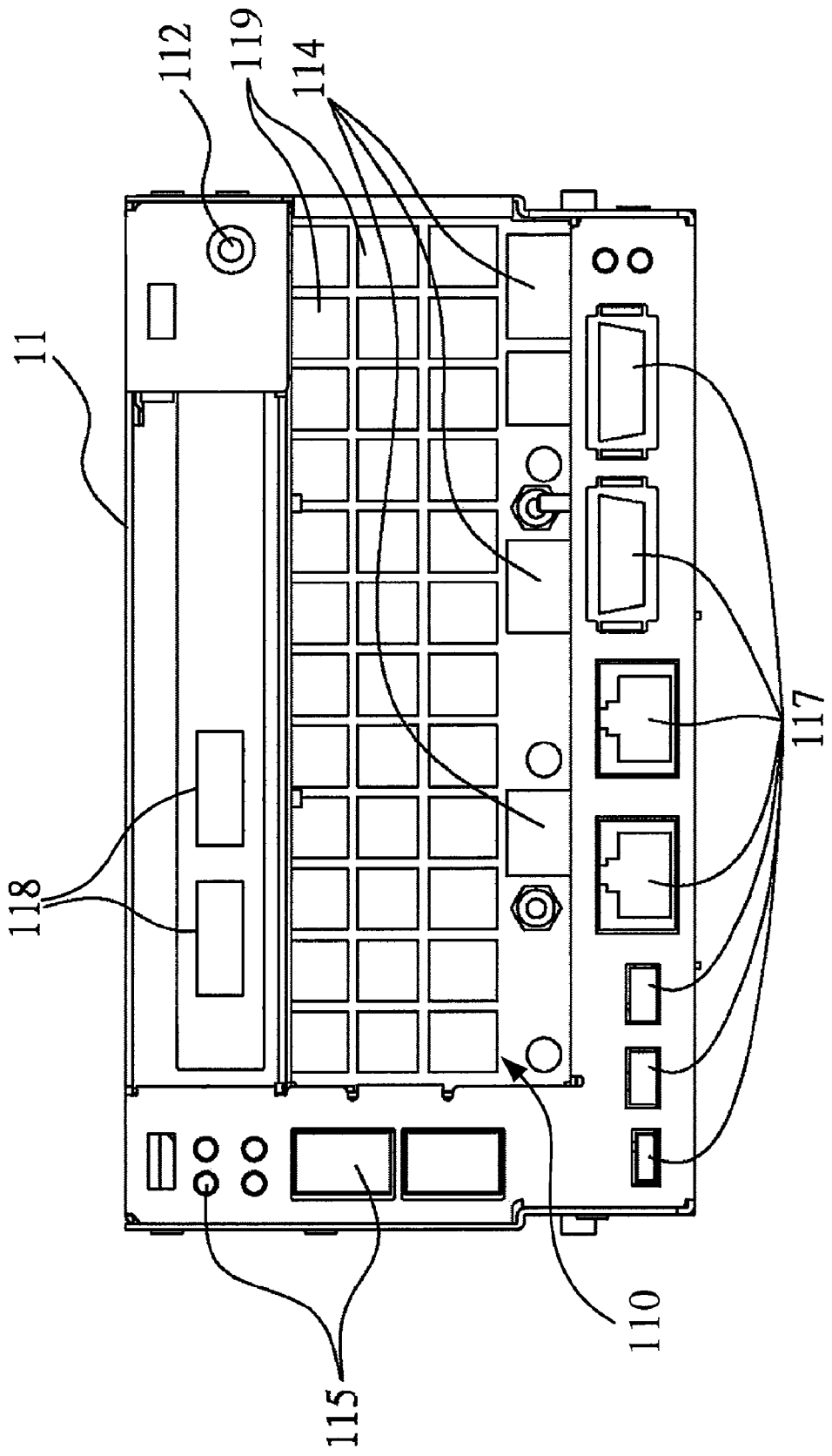
FIG. 4 illustrates an enlarged view of a side housing in FIG. 2.

Please refer to FIGS. 2-4. The computer system includes a main housing 10 and a side housing 11. The side housing 11 is assembled to the front of the main housing 10 as a frame so as to form a unitary housing. The side housing 11 is fastened to the main housing 10 by a bolt 113 being screwed through a hole 112 and into a threaded hole 103.

Several circuit boards are enclosed within the unitary housing, consisting of the main housing 10 and the side housing 11. A motherboard 13 is secured to and in parallel with an inner flat surface of a bottom wall 104 of the main housing 10. A riser card 14 is perpendicularly connected with the motherboard 13 by a motherboard connector 130. The riser card 14 is further secured to and in parallel with an inner flat surface of a side wall 102. An expansion card 15 is perpendicularly connected with the riser card 14 by an expansion port 140. Preferably, the riser card 14 substantially abuts on the bottom wall 104 and the expansion card 15 substantially abuts on the side wall 102. Thus, the side housing 11 can occupy more space among the motherboard 13, the riser card 14 and the expansion card 15 for the fan module 12 to be accommodated.

Above three circuit boards all have I/O ports (input/out port) (See FIG. 2). The motherboard 13 has a series of I/O ports 131 arranged at its edge. The riser card 14 has a series of I/O ports 141 and I/O LED 143 arranged at its edge. The riser card 14 further includes an I/O control chip 142 for controlling the series of I/O ports 141 and I/O LED 143. The expansion card 15 has a series of I/O ports 150 arranged at its edge.

The side housing 11 has a plurality of openings to expose each I/O port of above three circuit boards (see FIG. 2 and FIG. 4). Openings 117 of the side housing 11 respectively expose each of the series of I/O ports 131 of the motherboard 13. Openings 115 of the side housing 11 respectively expose each of the series of I/O ports 141 and I/O LED 143 of the riser card 14. Openings 118 of the side housing 11 respectively expose each of the series of I/O ports 150 of the expansion card 15. Openings 117 and Openings 115, which expose I/O ports 131, I/O ports 141 and I/O LED 143, form an L-shaped I/O port area around the concave portion 110 on a flat surface of the side housing 11.

The side housing 11 further has the concave portion 110 to accommodate a fan module 12 (see FIGS. 2-4). In order to electrically interconnect the fan module 12 and the motherboard 13, a fan control board 16 is needed to achieve such purpose. The fan control board 16 is perpendicularly connected with the motherboard 13 (See FIG. 2) and connection ports 160 are exposed by openings 114 within the concave portion 110 (see FIG. 4) such that the fan module 12 can be detachably connected with connection ports 160 within the concave portion 110. The fan module 12 generates airflows circulated through ventilation holes 119 within the concave portion 110 such that heat inside the unitary housing can be removed. Since the fan module 12 can be detachably connected with connection ports 160, a failed fan module 12 can be removed from the concave portion 110 and hot swapped by a new one, as soon as the fan module 12 fails.

Figure 5:
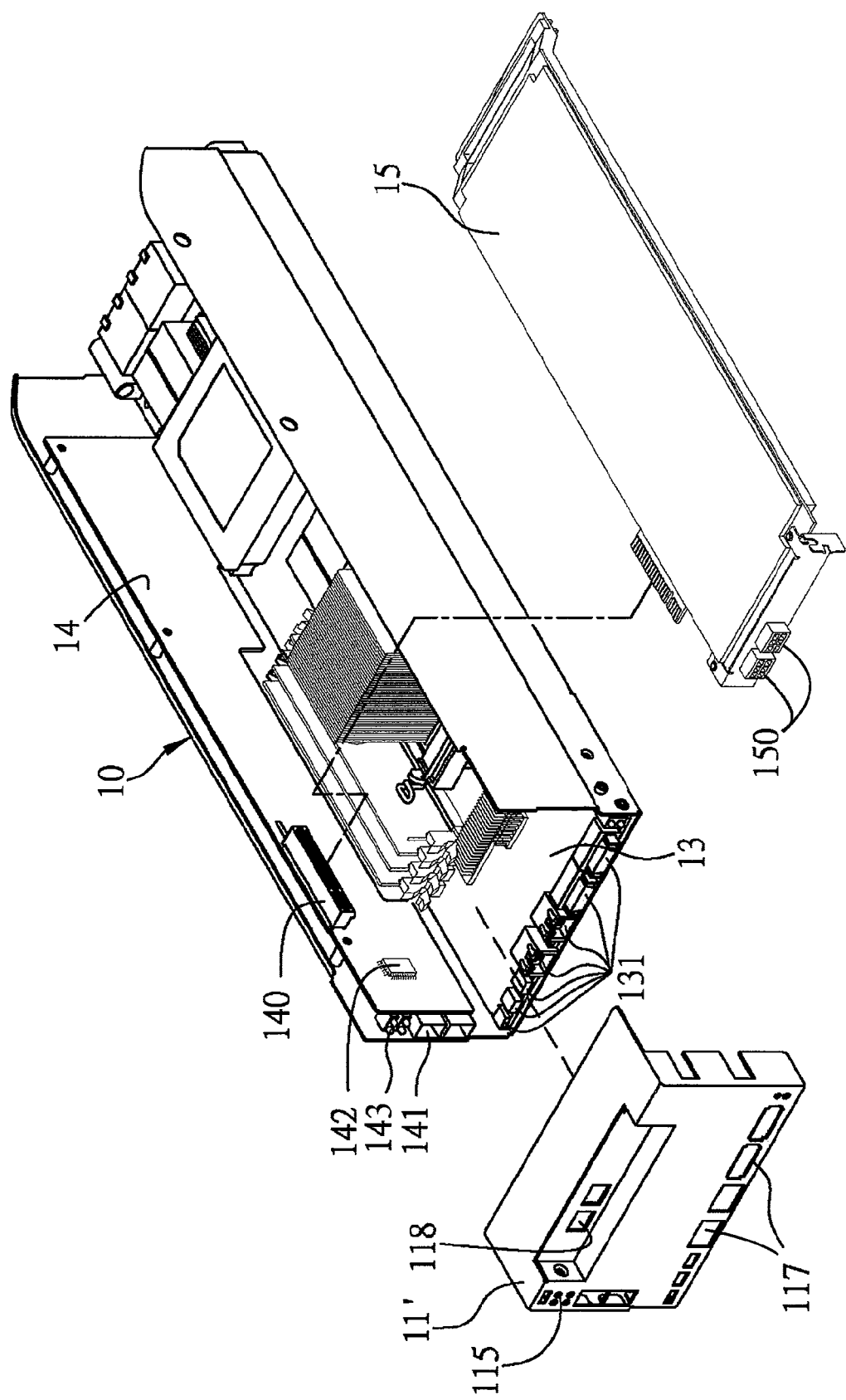
FIG. 5 illustrates an exploded view of a computer system according to another embodiment of this invention.

FIG. 5 illustrates an exploded view of a computer system according to another embodiment of this invention. The embodiment in FIG. 1 can be varied in the side housing 11 so as to form the embodiment in FIG. 5. In particular, the side housing 11' does not include a concave portion 110 (as illustrated in FIG. 1) to accommodate a fan module. Therefore, the fan module 12 (illustrated in FIG. 1) needs to be enclosed within the unitary housing, consisting of the main housing 10 and the side housing 11. However, the fan module 12 can still be installed among the motherboard 13, the riser card 14 and the expansion card 15.

According to embodiments, the present invention provides a physical configuration of a computer system to place a fan module and more I/O ports densely in a back end of the housing. Besides, the housing can have a concave portion allowing the fan module to be accommodated and easily hot swapped by a new one, as soon as the fan module fails.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer system having a physical configuration comprising:
   a motherboard, having a first series of I/O ports at an edge thereof;
   a riser card, perpendicularly connected with the motherboard, wherein the riser card has a second series of I/O ports at an edge thereof;
   a fan module, electrically connected with the motherboard;
   a main housing;
   a side housing assembled to the main housing so as to form a unitary housing, enclosing the motherboard and the riser card,
   wherein the side housing has a concave portion to accommodate the fan module;
   wherein the side housing has a plurality of openings, exposing each of the first series of I/O ports and the second series of I/O ports so as to form an L-shaped I/O port area around the concave portion on a flat surface thereof.

2. The computer system of claim 1, further comprising a fan control board perpendicularly connected with the motherboard for electrically interconnecting the motherboard and the fan module.

3. The computer system of claim 2, wherein the concave portion comprises another opening to expose a connection port of the fan control board such that the fan module is detachably connected with the connection port.

4. The computer system of claim 1, further comprising an expansion card enclosed within the unitary housing, wherein the expansion card is perpendicularly connected with the riser card, and has a third series of I/O ports at an edge thereof.

5. The computer system of claim 4, wherein the plurality of openings further exposes each of the third series of I/O ports.

6. The computer system of claim 1, wherein the motherboard is secured to and in parallel with an inner flat surface of the main housing.

7. The computer system of claim 6, wherein the riser card is secured to and in parallel with another inner flat surface of the main housing.

8. The computer system of claim 1, wherein the concave portion comprises a plurality of ventilation holes, allowing airflows generated by the fan module circulation to be circulated.

9. The computer system of claim 1, wherein the riser card substantially abuts on the motherboard.

10. The computer system of claim 9, wherein the expansion card substantially abuts on the riser card.

\* \* \* \* \*